Patented Aug. 4, 1931

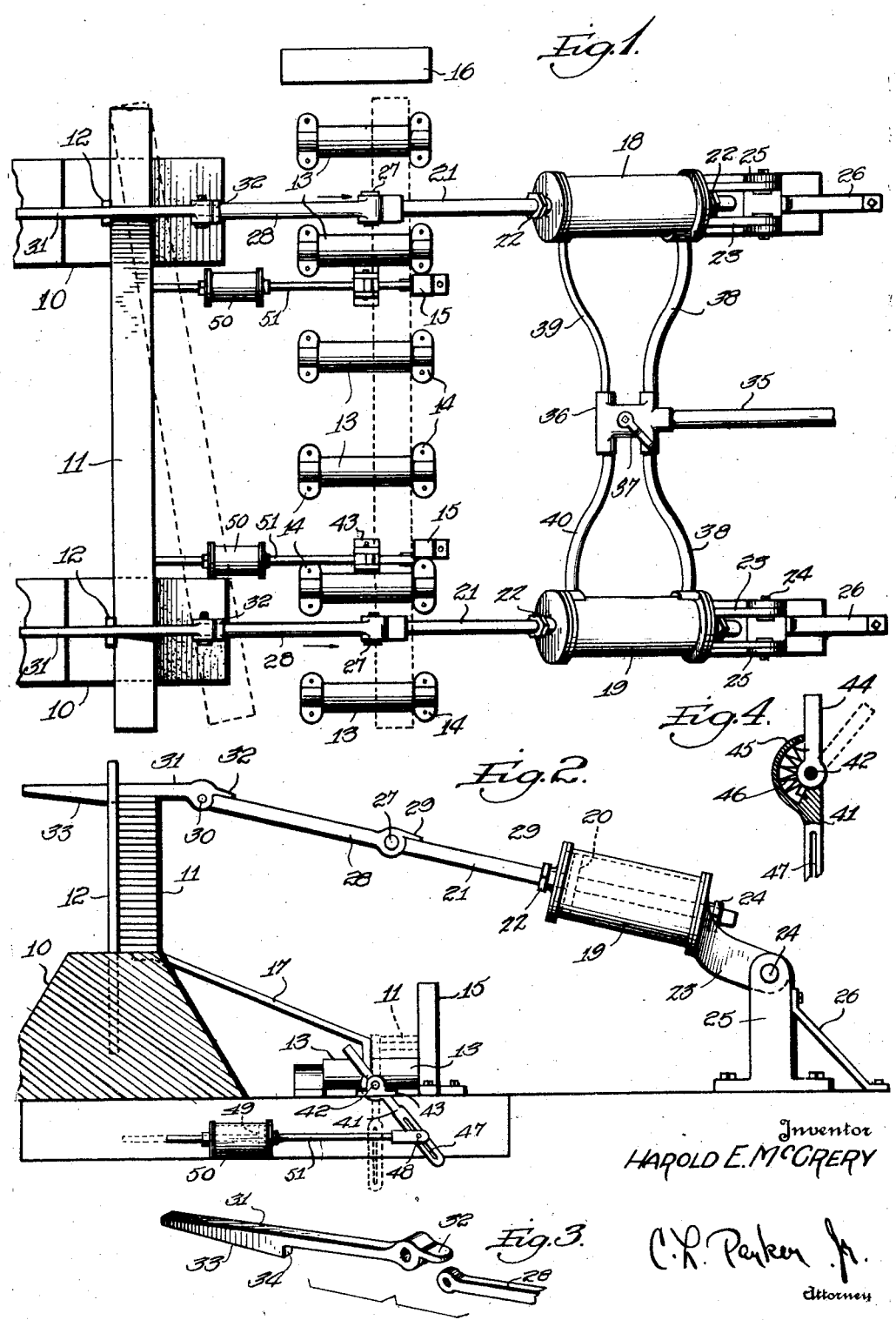

1,817,387

UNITED STATES PATENT OFFICE

HAROLD E. McCRERY, OF APOLLO, PENNSYLVANIA, ASSIGNOR TO APOLLO HOLDING CORPORATION, OF APOLLO, PENNSYLVANIA, A CORPORATION OF DELAWARE

SHEET BAR UNSTACKING DEVICE

Application filed October 5, 1928. Serial No. 310,612.

This invention relates to sheet bar unstacking devices.

In the manufacture of sheet metal, it is the common practice to form the metal into relatively heavy flat bars which are subsequently cut into various lengths prior to being rolled into sheets. For this purpose, overhead cranes usually are employed for arranging the bars in piles adjacent a suitable conveying apparatus, and the bars ordinarily are transferred by hand to the conveyor to be moved endwise into a suitable shearing apparatus.

An important object of the present invention is to provide mechanical means for transferring the sheet bars from piles to the conveyor for movement into the shearing apparatus.

A further object is to provide a device of the above mentioned character wherein a pull is exerted at opposite ends of one or more of the uppermost sheet bars to remove them from the pile or stack, the pulling force being unequal at opposite ends of the bars to cause the latter more readily to slide from the top of the stack.

A further object is to provide novel means for exerting uneven pull at the opposite ends of the bars for the purpose stated.

A further object is to provide novel means for lining up one or more sheet bars in position on the conveying means for proper movement into the shearing apparatus.

Other objects and advantages of the invention will become apparent during the course of the following description.

In the drawings I have shown one embodiment of the invention. In this showing,

Figure 1 is a plan view,

Figure 2 is a side elevation,

Figure 3 is a detail perspective of one of the pulling fingers and associated elements, and, Figure 4 is a detail fragmentary side elevation of a portion of one of the alining devices.

Referring to the drawings, the numeral 10 designates a pair of supporting foundations upon which a plurality of sheet bars 11 are adapted to be placed in superimposed position by an overhead crane or other stacking means. Vertical standards 12 extend upwardly from the foundations 10 to act as guides in properly stacking the sheet bars.

A plurality of conveyor rolls 13 are arranged in a line parallel to the stack of sheet bars, as shown in Figures 1 and 2, and are adapted to be rotatably supported by suitable bearings 14. Two or more standards 15 are arranged adjacent one side of the line of conveyor rolls to act as guide means for lining up the bars on the conveyors. The rolls 13 are adapted to support the sheet bars for endwise movement into a suitable shearing apparatus indicated generally by the numeral 16. One or more of the sheet bars is adapted to be conveyed at one time into the shearing apparatus, and in Figure 2 of the drawing three of the sheet bars are indicated by dotted lines in position on the conveyor rolls. For the purpose of guiding the sheet bars to position on the rolls, two or more inclines 17 extend between the tops of the foundations 10 to a point between and above the conveyor rolls.

A pair of cylinders 18 and 19 is arranged adjacent the conveyor rolls at the side thereof opposite the stack of sheet bars. Each of these cylinders is provided with a piston 20 carried by a piston rod 21 which operates in packing glands 22 formed in opposite ends of the cylinders. The cylinders are provided with extensions 23 pivotally supported as at 24, upon the upper ends of standards 25 which may be suitably braced as at 26.

Each piston rod 21 is pivotally connected as at 27 to one end of a rod 28, the latter being provided with a finger 29 overhanging the piston rod to prevent swinging movement of the rod 28 upwardly beyond the position shown in Figure 2. The outer end of the rod 28 is pivotally connected as at 30 to one end of a puller arm 31 which also is provided with a finger 32 overhanging the rod 28, thus preventing upward swinging movement of the arm 31 beyond the position shown in Figure 2. Thus it will be apparent that the weight of the standards and associated elements, and the weights of the arms 28 and 31 are supported upon the uppermost bar in the stack. The under side of the outer end of each arm 31 is inclined as at 33 to provide a hook 34 adapted to engage the uppermost bar of the stack, or two or more bars if desired.

The pistons 20 are adapted to be operated by compressed air which may be supplied to the cylinders through a main supply pipe 35 connected to a valve chest 36. A suitable control valve (not shown) is arranged in the valve chest 36 and is adapted to be operated by a suitable handle 37. This valve is movable to one position to admit air pressure into the outer ends of the cylinders 18 and 19 through flexible connections 38 while air is exhausted from the opposite ends of the cylinders. The valve handle is operable to a second position to exhaust air from the outer ends of the cylinders and to admit air into the inner ends thereof through flexible connections 39 and 40 respectively.

It will be obvious that the flexible connection 39 is materially smaller than the connection 40, and accordingly air will be admitted more rapidly into the inner end of the cylinder 19 than into the corresponding end of the cylinder 18, thus exerting an uneven pull on the hooks 34 to slide one end of the uppermost sheet bar from the stack ahead of the other end, this action being found desirable to facilitate the sliding action of the bar from the top of the stack. This movement of the uppermost bar is indicated in dotted lines in Figure 1.

The pulling of the uppermost bar or bars from the stack causes them to fall downwardly upon the inclines 17 for sliding movement to the conveyor rolls. The lower ends of the inclines 17 are arranged above the tops of the conveyor rolls to form with the standards 15 pockets to receive the bars whereby more than one bar may be conveyed to the shears at one time if desired.

Means is provided for properly lining up the bars upon the conveyor rolls for movement to the shears. As shown, a pair of swinging arms 41 are pivotally supported by shafts 42 in bearings 43 and depend therefrom. The arms 41 are provided at their upper ends with fingers 44, also pivotally connected to the shafts 42. The fingers 44 contact with extensions 45 carried by the arms 41, thus limiting the turning movement of the fingers in one direction, while movement of these fingers in the opposite direction is resiliently opposed by springs 46.

The arms 41 are slotted as at 47, and pins 48 are arranged in these slots. A piston 49 is mounted in each of two cylinders 50 and a piston rod 51 is connected to each of these pistons. The pins 48 are connected to the outer ends of the piston rods 51 whereby the arms 41 are adapted to swing from the solid to the dotted line positions indicated in Figure 2.

The operation of the device is as follows:

The sheet bars are placed in superimposed position on the foundations 10, as shown in Figures 1 and 2. The arms 31 are then placed in position on the top of the stack, and the device is ready for operation. The valve handle 37 is moved to admit air pressure to the inner ends of the cylinders 18 and 19 through the flexible connections 39 and 40, while air is exhausted from the rear ends of the cylinders through the connections 38. The pistons 20 then start to move to pull the piston rods 21, rods 28 and arms 31. Owing to the differential admission of pressure into the cylinders, one of the pistons moves faster than the other, thus exerting an uneven pull upon the uppermost bar or bars of the stack. This causes the dislodged bar or bars to slide readily from the next lower bar, and to fall upon the inclines 17 for sliding movement to the conveyor rolls.

As the uppermost bar is pulled from the stack, the inclined face 33 of each arm 31 will be supported upon the next lower bar of the stack, and the parts are then ready for return movement to normal position. To accomplish this movement, the handle 39 is moved to admit air pressure into the outer ends of the cylinders through the connections 38, while air is exhausted from the opposite ends of the cylinders through the connections 39 and 40. Thus the arms 31 will return to normal position and the hooks 34 will drop in position behind the next sheet bar.

The conveyor rolls 13 if desired, may be power driven to move the bars to the shearing device, but in the present instance, they are shown merely as rotatably supported rollers which are adapted to be operated by manually pushing the bars thereover. The bars are moved from the conveyor to the shearing device 16 whereupon they are cut in suitable lengths to be rolled out into sheets.

The hooks 34 of the arms 31 are shown of a depth equal to the thickness of one of the sheet bars, and when it is desired to cut two or more bars at one time, the device may be successively operated to unstack successive bars from the top of the stock. If desired, the hooks 34 may be made of a depth equal to the thickness of two or more bars whereby a number of the latter may be unstacked simultaneously.

The bars are adapted to slide to the conveyor rolls with substantial accuracy. However, it is desired to provide the alining devices so that the bars may be more accurately lined up on the conveyor rolls in contact with the standards 15. Ordinarily, the arms 41 occupy the position shown in full lines in Figure 2 of the drawings. Any suitable means may be employed for admitting air into the inner ends of the cylinders 50 after the bars are in position on the conveyor rolls. This action causes the pistons 49 to move and pull the piston rods 51, thus moving the arms 41 to the dotted line position shown in Figure 2, the fingers 44 contacting with the edges of the bars on the conveyor rolls 13 to move the bars into contact with the standards 15, in proper position for movement to the shears.

After this action is completed, air is admitted into the opposite ends of the cylinders 50 to return the parts of the alining device to normal position. If for any reason, the cylinder 50 and associated parts fails to function to return the parts to normal position, movement of subsequent sheet bars down the inclines 17 will cause the fingers 44 to swing against the tension of the springs 46 as suggested in dotted lines in Figure 4. Thus the pivoted arrangement of the fingers 44 prevents any possible injury thereto.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device of the character described comprising a pair of relatively movable members adapted to engage at least the uppermost bar of a stack of superimposed bars, operating means for moving said members transversely of the stack to slide the uppermost bar or bars therefrom, and means acting upon said operating means to move one of said members faster than the other.

2. A device of the character described comprising a pair of relatively movable members adapted to engage at least the uppermost bar of a stack of superimposed bars, and means for imparting differential movement to said members transversely of the stack.

3. A device of the character described comprising a pair of relatively movable members adapted to rest upon the uppermost bar of a stack of bars, each member having a portion adapted to engage the edge portions of at least the uppermost bar, and means for transmitting differenial pulling forces to said members to cause the uppermost bar or bars to slide transversely from the stack.

4. A device of the character described comprising a pair of relatively movable members adapted to rest upon the uppermost bar of a stack of bars, each member having a portion adapted to engage the edge portions of at least the uppermost bar, expansible chamber means connected to each of said members, and means for supplying differential fluid pressure to said expansible chamber means to move said members to cause the uppermost bar or bars of the stack to slide transversely therefrom.

5. A device of the character described comprising a pair of members having hook portions adapted to engage on opposite sides of the center against one side of at least the uppermost bar of a stack of bars, a pair of cylinders, a piston mounted to reciprocate in each cylinder, means for connecting each of said pistons to one of said members, and means for differentially introducing fluid pressure into said cylinders to cause the hook portions of said members to exert an unequal pulling force against the uppermost bar or bars of the stack transversely thereof.

In testimony whereof I affix my signature.

HAROLD E. McCRERY.